United States Patent [19]

Bosse

[11] Patent Number: 4,536,651
[45] Date of Patent: Aug. 20, 1985

[54] OPTICAL WEIGHING SCALE UTILIZING A PRISM

[75] Inventor: Thomas W. Bosse, New Milford, Conn.

[73] Assignee: Pitney Bowes Inc., Stamford, Conn.

[21] Appl. No.: 474,852

[22] Filed: Mar. 14, 1983

[51] Int. Cl.³ ................................................ G01L 1/24
[52] U.S. Cl. .......................... 250/231 R; 177/DIG. 6; 350/286; 356/136; 73/705
[58] Field of Search .................... 250/231 R, 231 P; 350/112, 286; 356/135–137, 32–34; 177/DIG. 3, DIG. 6; 73/705, 763, 765, 766, 800

[56] References Cited

U.S. PATENT DOCUMENTS 4,322,979  4/1982  Fromm ................................. 73/705
4,408,123  10/1983  Sichling et al. ................. 250/231 R Primary Examiner—Edward P. Westin
Attorney, Agent, or Firm—Peter Vrahotes; William D. Soltow, Jr.; Albert W. Scribner

[57] ABSTRACT

An optical transducer that uses a prism for the purpose of determining a load applied thereto which may be used to find the weight of an object. In accordance with known optical principals, when a load is applied to a material such as plastic, glass, crystal and the like, its index of refraction changes. By measuring the change of intensity of light internally reflected from a prism made of such material, the magnitude of a load applied thereto can be determined.

7 Claims, 3 Drawing Figures

U.S. Patent   Aug. 20, 1985   4,536,651
FIG. 1
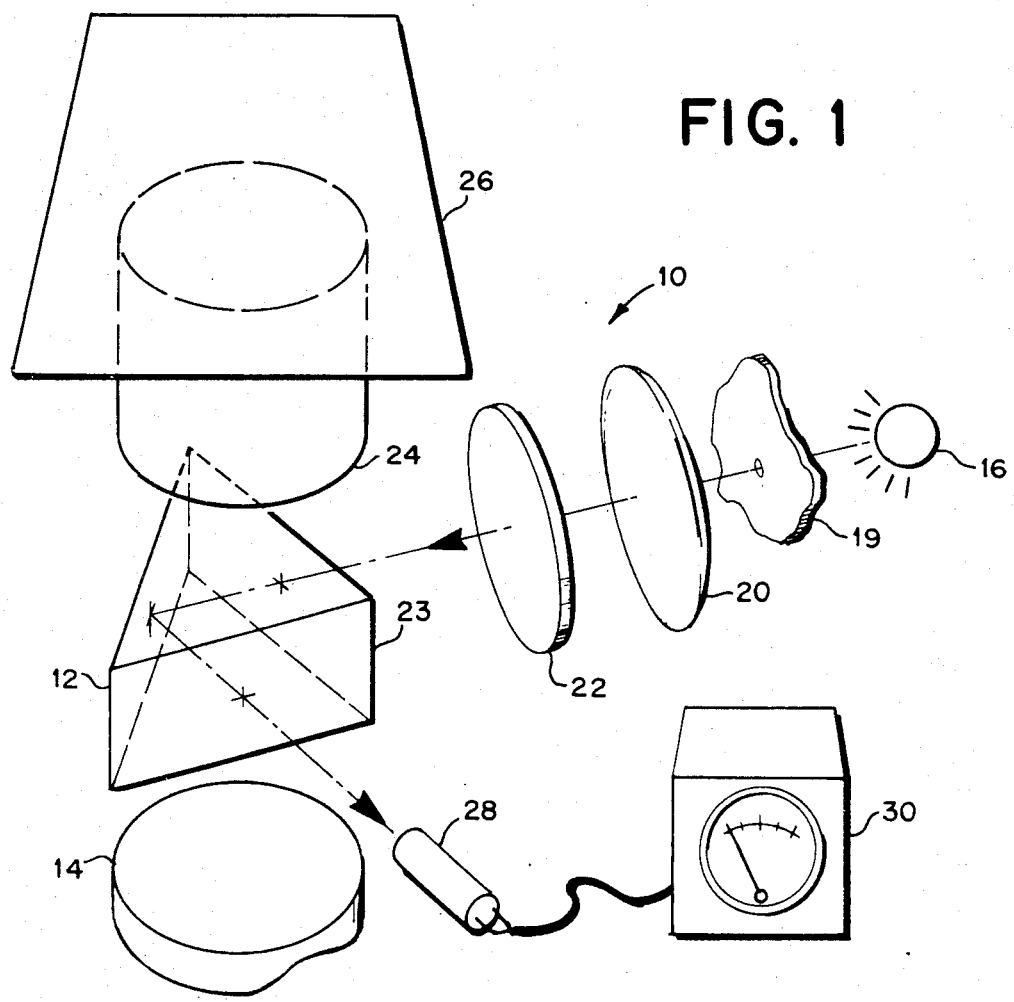
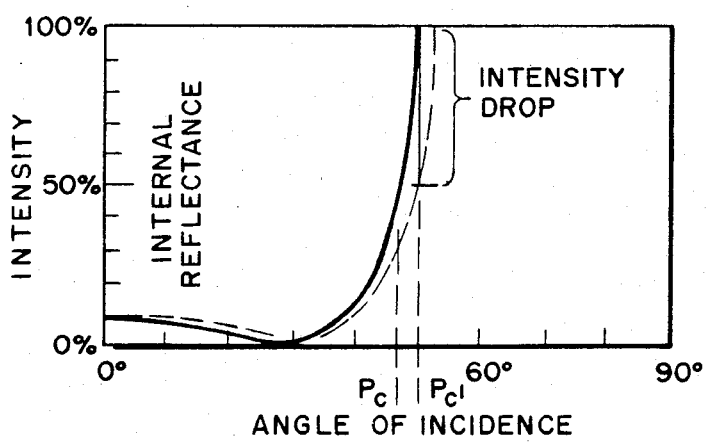
FIG. 2
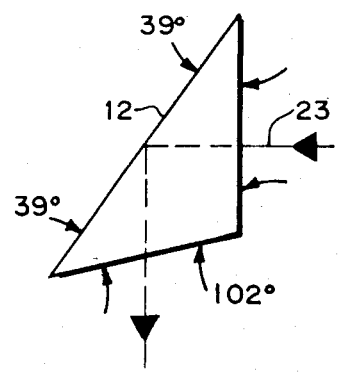
FIG. 3

OPTICAL WEIGHING SCALE UTILIZING A PRISM

BACKGROUND OF THE INVENTION

In the field of weighing scales, one is constantly seeking a scale that will be reliable over a broad range, durable, and inexpensive to manufacture and maintain. Many different types of weighing scales have been used in the past including spring scales, scales with vibrating strings, piezoelectric devices (load cells) and others. As one would expect, each of these scales has its unique advantages and disadvantages. Spring scales have not been found to be highly accurate for small weights. Scales utilizing a vibrating string are too dependent on the characteristic of the material from which the wire is made and load cell scales generally have to be designed for specific weight ranges. It obviously would be desirable to have a scale wherein weights over relatively wide ranges may be determined and still obtain a high degree of reliability, economy, and durability.

SUMMARY OF THE INVENTION

A scale has been conceived that includes a transducer which utilizes the principles from Fresnel's equation and Snell's law. The transducer is further based on the principle that there are prisms made of optical materials which will have a change in their index of refraction upon a load being applied to such a prism, this causing the well-known phenomenon of birefringence. In combination with the previously mentioned principles, such prisms may be utilized for determining a load that is applied thereto and thus obtain a reliable method for determining the weight of an object. More specifically, such an optical scale has particularly unique advantages in measuring small weight increments in an overall wide range of weights with a large signal being received in response to a small thrust.

BRIEF DESCRIPTION OF THE DRAWINGS

FIG. 1 shows a partially exploded, perspective view of an optical scale made in accordance with the instant invention;

FIG. 2 is a graph showing the affects of the angle of incidence on intensity of light internally reflected by a prism; and FIG. 3 is an example of a prism that may be used in carrying out the instant invention.

DETAILED DESCRIPTION OF THE PREFERRED EMBODIMENT

The invention of utilizing an optical transducer for the purpose of measuring a thrust will be described in its application to a weighing scale; however, it will be appreciated any thrust may be measured including air pressure. An optical scale is shown generally at 10 and includes a prism 12 that is mounted on a support 14. A light source 16, preferably white light, is located adjacent to an aperture 19 and a collimating lens 20 addresses the aperture. Located intermediate the prism 12 and the lense 20 is a polarizer 22. The light in this preferred embodiment will be described as being polarized in a direction parallel to the plane of incidence, but it will be appreciated that the same principles would apply for light polarized in the perpendicular direction. The prism 12 is positioned on the support 14 to allow an incoming beam of polarized light 23 to be directed upon one face thereof. The light 23 will be internally reflected at the hypotenuse of the prism 12 so that it exits out of the other face of the prism. A post 24 supports a platform 26, the post 24 resting upon the prism 12. Although shown exploded in FIG. 1, it will be appreciated that the post 24 bears upon the prism 12 and the prism in turn rests upon the support 14. It will be appreciated that the prism 12 is under stress from the thrust of the post 24 and platform 26 but this rest position will hereinafter be considered as the prism having no load thereon. A photosensor 28 is located at the position where the beam of light 23 will exit the prism 12 and is in electrical connection with a gauge 30. The gauge 30 is one which will measure the voltage generated within the photosensor 28 by the light beam 23 incident upon it thus indicating the intensity of light internally reflected from the hypotenuse of the prism 12.

A prism 12 may be constructed from material such as polycarbonate plastic or glass. Referring now to FIG. 3, the critical angle of a prism 12 made of polycarbonate plastic is 39°. The index of refraction (n) for that material when not under stress is 1.586. Based upon the formula $P_c = \sin^{-1}(1/n)$, the critical angle can be computed to be 39°; when the prism 12 is under stress, its index of refraction changes to a new value $n_s$. Consequently, as shown in FIG. 2, the reflectance from the surface of the hypotenuse in a prism 12 is different when a thrust is applied to the prism than when a thrust is not applied and the angle of incidence is constant. This is particularly pronounced if the angle of incidence lies just under the critical angle. Although the change in reflectivity is more pronounced in the range just below the critical angle than it is substantially below, and it is preferable to work in the former range, it will be appreciated any part of the curve in FIG. 2 may be utilized. Change in reflectivity is detected by the photoreceptor 28 and the gauge 30 indicates the changes of intensity in terms of voltage. The intensity is determined in accordance with the formula:

$$r_p = \frac{\tan^2[P - \sin^{-1}(n \sin P)]}{\tan^2[P + \sin^{-1}(n \sin P)]}$$

where $r_p$ is the reflectance for the light vibrating parallel to the angle of incidence P is the internal angle of incidence on the hypotenuse, and n is the instantaneous value of the index of refraction In FIG. 2, a graph shows the effect on light intensity for polarized light as it is reflected from the hypotenuse of a prism 12. When a weight is placed upon the platform 26, a load will be transmitted through the post 24 and a stress applied to the prism 12. This stress will result in a different index of refraction and a resulting different critical angle $P_{c'}$. As a consequence, the intensity of light as seen by the photosensor 28 will change since it is no longer receiving the maximum amount of light reflected from the prism 12, i.e., less light will be reflected from the hypotenuse and a greater percentage will be refracted. As seen in FIG. 2, one would be able to measure the magnitude of a weight placed upon the platform 26 by the change of intensity of light in accordance with the curve. If the photosensor 28 is placed in such a position as to receive the light reflected from the hypotenuse when the angle of incidence is at the critical angle, it will have a certain intensity, which will be approximately 92% of intensity of the incoming light.

As a load is applied, the curve shifts, either to the left or right, depending upon the affect on index of refraction of the material, and a change in intensity of light occurs. This is because the angle of the prism remains constant but it is no longer the critical angle once a load is applied to the prism. Through empirical methods the relationship between the change in light intensity and the weight applied to the platform may be determined.

As is known, the index of refraction of a prism 12 may be increased or decreased upon a thrust being applied thereto. This is dependent upon whether the prism exhibits a positive or negative change of index of refraction. In the example given above, it was assumed the prism exhibited a positive index change but it will be appreciated that the same principles apply to a prism that exhibits a negative change. In the application, one could start at a lower range of the curve shown in FIG. 2 for prisms having a negative change of index of refraction.

What is claimed is:

1. An optical transducer comprising:
   an optical prism, means for supporting said prism, means for selectively applying a load to said prism parallel to said support means, means for directing light to said prism substantially normal to the direction said load is applied and means for determining the magnitude of said load by measuring the intensity of light internally reflected from said prism.

2. The optical transducer of claim 1 wherein said prism is triangular and is constructed so that the angles adjacent the hypotenuse are substantially the critical angle for the prism.

3. The optical transducer of claim 2 wherein said means for directing light directs light to one face of the prism, is reflected from the hypotenuse and exits out the third face of the triangle.

4. The optical transducer of claim 3 wherein said means for measuring light intensity is located to receive substantially the maximum intensity of the light incident on the hypotenuse when the prism is substantially totally stressed.

5. The optical transducer of claim 3 wherein said means for measuring light intensity is located to receive substantially an intermediate intensity of the light incident on the hypotenuse when the prism is totally stressed.

6. The optical transducer of claim 1 including polarizing means intermediate said light directing means and said prism.

7. In a method of determining the magnitude of a load upon a prism, the steps comprising:
   supporting a prism, selectively applying a load to the prism parallel to the support, directing light to one face of the prism normal to the direction the load is applied and determining the magnitude of the load by measuring the intensity of light internally reflected from the prism.

* * * * *